United States Patent

Keating et al.

[11] Patent Number: 5,822,009
[45] Date of Patent: Oct. 13, 1998

[54] VIDEO DOWN-CONVERSION

[75] Inventors: Stephen Mark Keating, Reading; Andrew Campbell, Yateley; James Edward Burns, Basingstoke; Ahmad Sadjadian, Swindon, all of United Kingdom

[73] Assignees: Sony Corporation, Tokyo, Japan; Sony United Kingdom Limited, Weybridge, England

[21] Appl. No.: 738,827

[22] Filed: Oct. 28, 1996

[30] Foreign Application Priority Data

Nov. 9, 1995 [GB] United Kingdom ............ 9522961

[51] Int. Cl.$^6$ ........................................ H04N 7/01
[52] U.S. Cl. ............................ 348/458; 348/443
[58] Field of Search ............................ 348/443, 458, 348/446, 445; 382/298–300

[56] References Cited

U.S. PATENT DOCUMENTS 4,766,494  8/1988  Doyle .................................. 348/458
5,031,040  7/1991  Maruyama ........................... 348/458

FOREIGN PATENT DOCUMENTS 2248743  4/1992  United Kingdom .

*Primary Examiner*—Victor R. Kostak
*Attorney, Agent, or Firm*—Frommer Lawrence & Haug LLP; William S. Frommer

[57] ABSTRACT

Video down-conversion apparatus in which lines of successive output video field are interpolated from lines of respective input video fields, the apparatus being selectively operable to interpolate each output field from an input field of either field polarity so that the successive output video fields can maintain a regular odd-even field polarity sequence even if there is a discontinuity in the field polarity sequence of the input video fields.

10 Claims, 10 Drawing Sheets

| Address | Data (bytes) |
|---|---|
| 0x000 | Pixel Conversion Control |
| 0x001 | H Crop Position (coarse) |
| 0x002 | Line Conversion Control |
| 0x003 | Image Enhancer Control 1 |
| 0x004 | Image Enhancer Control 2 |
| 0x005 | Image Enhancer Control 3 |
| 0x006 | Image Enhancer Control 4 |
| 0x007 | Gamma Conversion Control |
| 0x008 | Colorimetry and Output Control |
| 0x009 | External FIFO Timing Control |
| 0x010 - 0x047 | H Interp. Coeffs - Crop (4 position × 11 taps) |
| 0x050 - 0x087 | H Interp. Coeffs - Squeeze (3 position × 11 taps) + padding |
| 0x090 - 0x19F | V Interp. Coeffs - 525/2:1/edge-crop (16 position × 13 taps) |
| 0x1A0 - 0x2AF | V Interp. Coeffs - 625/2:1/edge-crop (16 position × 13 taps) |
| 0x2B0 - 0x3BF | V Interp. Coeffs - 525/1:1/edge-crop (16 position × 13 taps) |
| 0x3C0 - 0x4CF | V Interp. Coeffs - 525/2:1/letterbox (16 position × 13 taps) |
| 0x4D0 - 0x54F | Inverse (I/P) Gamma Coeffs - 1125 (64 + 64 words) |
| 0x550 - 0x5CF | Inverse (I/P) Gamma Coeffs - 1250 (64 + 64 words) |
| 0x5D0 - 0x64F | O/P Gamma Coeffs - 525-line (64 + 64 words) |
| 0x650 - 0x6CF | O/P Gamma Coeffs - 625-line (64 + 64 words) |
| 0x6D0 - 0x6E1 | Colorimetry Conversion Coeffs 240M to 525-line (9 coeffs × 2 bytes) |
| 0x6E2 - 0x6F3 | Colorimetry Conversion Coeffs Rec 709 to 525-line (9 coeffs × 2 bytes) |
| 0x6F4 - 0x705 | Colorimetry Conversion Coeffs 1250-line/Rec 709 to 625-line (9 coeffs × 2 bytes) |

Fig. 10

| Address | Data (bytes) |
|---|---|
| 0×000 | Pixel Conversion Control |
| 0×001 | H Crop Position (coarse) |
| 0×002 | Line Conversion Control |
| 0×003 | Image Enhancer Control 1 |
| 0×004 | Image Enhancer Control 2 |
| 0×005 | Image Enhancer Control 3 |
| 0×006 | Image Enhancer Control 4 |
| 0×007 | Gamma Conversion Control |
| 0×008 | Colorimetry and Output Control |
| 0×009 | External FIFO Timing Control |
| 0×010 - 0×047 | H Interp. Coeffs (4 × 11 words) |
| 0×050 - 0×15F | V Interp. Coeffs (16 × 13 words) |
| 0×160 - 0×1DF | Inverse (I/P) Gamma Coeffs (64 + 64 words) |
| 0×1E0 - 0×25F | O/P Gamma Coeffs (64 + 64 words) |
| 0×260 - 0×271 | Colorimetry Conversion Coeffs (2 bytes per coeff, 9 coeffs) |

Fig. 11

000
VIDEO DOWN-CONVERSION

BACKGROUND OF THE INVENTION

1. Field of the Invention

This invention relates to video down-conversion.

2. Description of the Prior Art

In a video down-converter, it might be possible to receive an input video signal in, say, an 1125 line or a 1250 line high definition video format and generate an output video signal in, say, a 525 or a 625 line conventional definition format.

In a conversion from an 1125 line high definition format to a 525 line lower definition format, the input high definition video signal could be derived from a high definition source operating at a field rate of 60 Hz. However, if a 525 line NTSC output is required, the field rate must be altered by one part in one thousand to 59.94 Hz. This can conveniently be done using a field-dropping converter, which drops one field in every few seconds of video, but this leads to sudden inversions in the field polarity of the signal output by the field-dropping converter.

The effect of a polarity inversion is particularly evident in a video format having an odd number of active lines, since one field will have one more line than the other field.

SUMMARY OF THE INVENTION

The invention provides video down-conversion apparatus in which lines of successive output video field are interpolated from lines of respective input video fields, the apparatus being selectively operable to interpolate each output field from an input field of either field polarity so that the successive output video fields can maintain a regular odd-even field polarity sequence even if there is a discontinuity in the field polarity sequence of the input video fields.

In order to cope with occasional field polarity inversions in its input video signal, a vertical interpolator in apparatus according to the invention can generate a particular polarity output field from either polarity of input field. This allows the field dropping converter to be placed upstream of the signal processing apparatus, and also means that the polarity inversions induced by the field-dropping converter are not present in the video signal at the output of the signal processing apparatus.

However, it has also been appreciated that this arrangement could lead to subjectively disturbing artifacts at the vertical extremes of the picture.

The potential problem which has been identified is that if the larger output field (i.e. the one having the extra line) is derived from and spatially aligned with the larger input field (again, the one having the extra line), then if the input field polarity inverts, the larger output field actually extends beyond the (smaller) input field from which it must be derived. The extreme top and bottom lines of the output field are then derived at least partly from black lines in the non-active area of the input field. However, in the other input polarity the extreme output lines are derived from active lines of the input field. Therefore, when an input field polarity inversion occurs, the extreme lines of the larger output field change in luminance because they change between an interpolation from active lines and an interpolation from non-active lines.

This problem is addressed in embodiments of the invention by spatially aligning the extreme lines of the output frame (i.e. the extreme lines of the larger output field) with non-extreme lines of the input frame (i.e. at least one line in from the top and bottom of the input frame). This means that the output picture is very slightly vertically cropped, but it is considered that this is preferable to subjectively disturbing luminance variations at the top and bottom edges of the picture every few seconds when an input polarity inversion occurs.

In one example, the extreme top and bottom lines of the larger output field can be spatially aligned with the next-to-top and next-to-bottom lines of the larger input field, the larger output field never extends beyond the input field from which it is to be derived, even if there is a field polarity change in the input video signal. However, in other embodiments, particularly where multi-tap vertical interpolation filters are used so that the artifacts described above could extend over several lines, the top and bottom lines of the larger output field can be spatially aligned with lines which are n lines from the top and bottom of the input frame.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 10 schematically illustrates the contents of a control read only memory (ROM) in the control apparatus of FIG. 4;

FIG. 11 schematically illustrates the contents of a control random access memory (RAM) in the control apparatus of FIG. 4;

DESCRIPTION OF THE PREFERRED EMBODIMENTS

Figure 1:
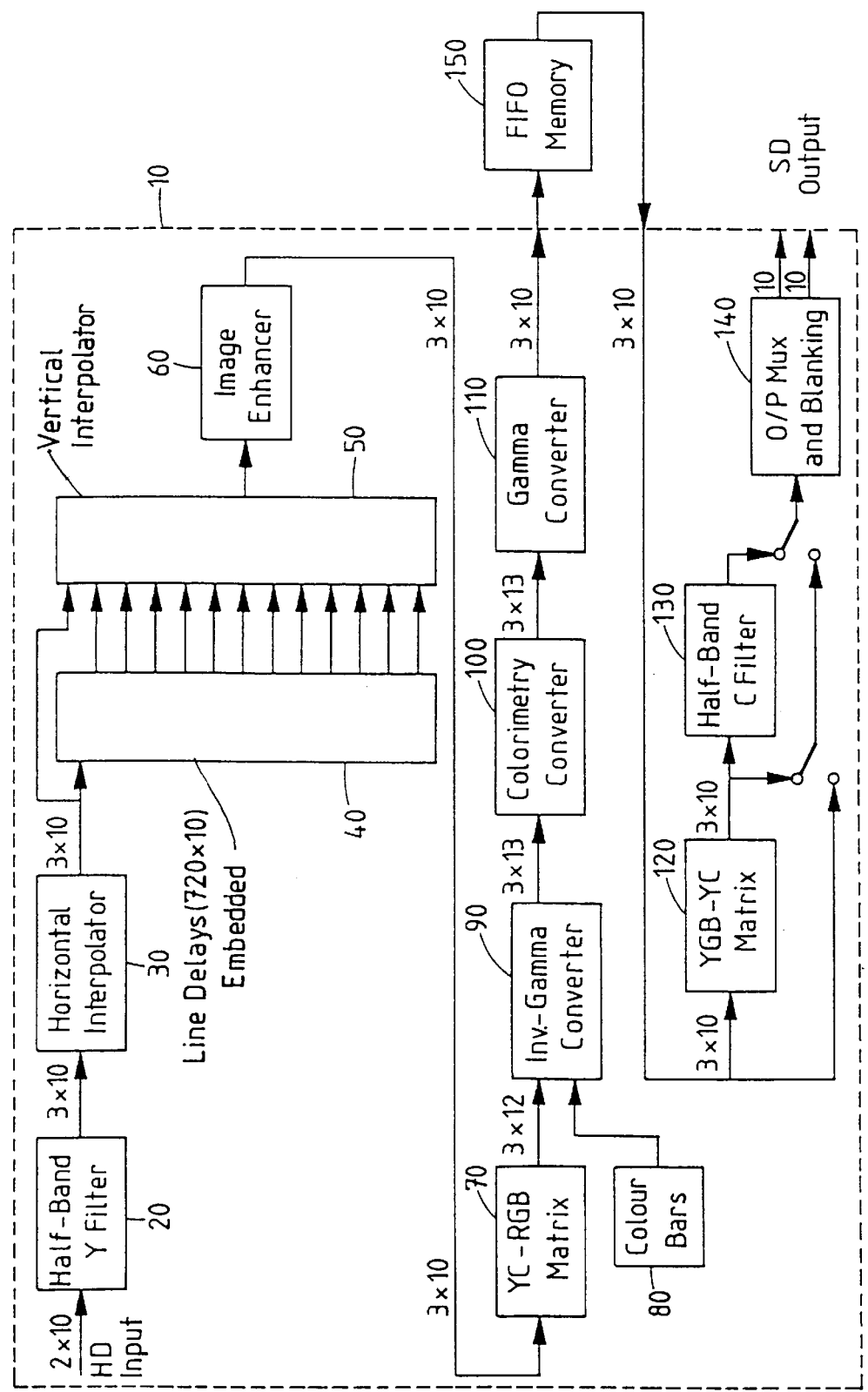
FIG. 1 is a schematic diagram of a down-conversion apparatus.

FIG. 1 is a schematic diagram of a down-conversion apparatus. All of the apparatus of FIG. 1, with the exception a FIFO memory 150, is embodied as a single application-specific integrated circuit (ASIC) 10.

The down-conversion apparatus receives a high definition digital video signal at its input and generates a standard or conventional definition digital video signal at its output. The down-conversion process involves horizontal down-conversion followed by vertical down-conversion. No temporal conversion is performed as both the input and output video signals are assumed to be at the same frame or field rate. The spatial down-conversion is followed by image enhancement, colour mapping and formatting of the video data to the required output standard.

Figure 2:
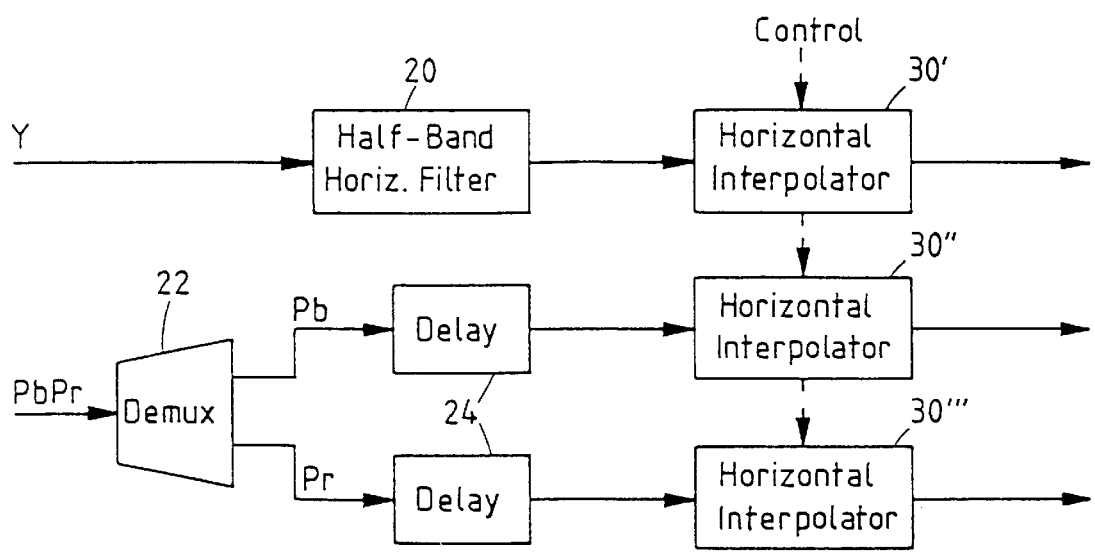
FIG. 2 is a schematic diagram of an input and horizontal interpolation stage of the apparatus of FIG. 1.

Various different standards conversions can be performed by the apparatus of FIG. 1, under the control of configuration data to be described below. These conversion modes are:
1035 lines/2:1 interlaced to 485 lines/2:1 interlaced
1080 lines/2:1 interlaced to 485 lines/2:1 interlaced
1035 lines/2:1 interlaced to 364 lines/2:1 interlaced
1080 lines/2:1 interlaced to 364 lines/2:1 interlaced
1152 lines/2:1 interlaced to 576 lines/2:1 interlaced
1035 lines/2:1 interlaced to 485 lines/1:1 progressive scan
1080 lines/2:1 interlaced to 485 lines/1:1 progressive scan High definition input video data is passed first to a half-band luminance filter 20 and from there to a horizontal interpolation stage 30. These stages are illustrated in more detail in FIG. 2, which shows the way in which a luminance data stream (Y) and a multiplexed chrominance data stream (PbPr) are received and treated differently at the input stages of the down converter. In particular, only the luminance data stream is supplied to the half-band filter 20. The multiplexed chrominance data stream is first passed to a demultiplexer 22 and the demultiplexed Pb and Pr signals are both delayed by delay elements 24 to compensate for the delay of the half-band horizontal filter. The filtered luminance data and delayed demultiplexed chrominance data are then passed to three respective horizontal interpolators 30', 30" and 30'''.

The justification behind this initial stage of processing is that in a so-called 4:2:2 high definition digital video signal at, say, a standard of 1125 lines, the luminance data stream (Y) has a data rate of 74 MHz and the two chrominance data streams Pb and Pr have respective data rates of 37 MHz (when these are multiplexed together, they provide a composite chrominance data stream having a data rate of 74 MHz). Because integrated circuits operating on a data stream at 74 MHz are technologically more difficult to produce and generally have a higher power consumption than circuits for handling data at 37 MHz, the first operation performed on the luminance data is to half-band filter and (not shown) decimate the data to provide a luminance data rate of 37 MHz. This means that only the half-band horizontal filter 20 in the luminance data path has to operate at a data rate of 74 MHz. (In order to operate at such a high processing speed, the half-band horizontal filter 20 is implemented using a shift and add architecture rather than a multiply and add architecture.)

Similarly, the 74 MHz multiplexed chrominance data stream PbPr is first demultiplexed (by the demultiplexer 22) to provide two separate 37 MHz data streams for subsequent processing. This means that in the chrominance data path only the demultiplexer 22 has to operate at the data rate of 74 MHz.

This arrangement also has the advantage that after half-band filtering and decimation of the luminance data, all subsequent processing takes place on luminance and chrominance data streams having identical data rates, i.e. on a 4:4:4 video signal. This provides the flexibility to generate an output signal in either the 4:4:4 standard or a 4:2:2 standard.

A further advantage of this arrangement is that the three horizontal interpolators 30', 30" and 30''' can all be made identical. In the case of an ASIC design, this can simplify the design work tremendously.

Returning to FIG. 1, it should be noted that only one of the three parallel signal paths (for the Y, Pb and Pr data respectively) is illustrated, for clarity of the diagram.

The purpose of the horizontal interpolator 30 is to convert from the number of pixels per line of the input (high definition) standard to the required number of pixels per line in the output (standard definition) standard. The horizontal interpolator 30 provides two ways of achieving this, to be referred to as "squeeze" and "edge crop" modes.

In the squeeze mode, the image content of an entire line of input pixels is used to generate a respective line of output pixels. This may lead to some horizontal compression distortion of the image if the aspect ratio of the output video signal is different to that of the input video signal. In contrast, in the edge crop mode, some image content at one or both ends of each line is discarded when the output lines are generated, but this has the compensation that horizontal compression distortion is not introduced into the output picture if the difference in input and output aspect ratios is compensated by the correct amount of edge cropping.

Therefore, the horizontal interpolator 30 has to generate lines of output pixels based on either a subset or all of each line of input pixels. In the edge crop mode it is capable of providing one quarter pixel offsets for fine adjustment of the horizontal position of the output (cropped) image with respective to each input image. In the squeeze mode it simply reduces the sample rate of the lines of pixels, generally by a factor of about ¾.

The vertical conversion process involves vertical interpolation followed by line dropping.

The output of the horizontal interpolator 30 is passed to a 12 line delay device 40 and from there to a 13 tap vertical interpolator 50. This generates output lines of pixels at the same line rate as the input lines. However, as described below, only some of the output lines of the vertical interpolator are treated as "active" lines, and the remainder are "dummy" lines which are discarded.

An optionally connected image enhancer is provided at the output of the vertical interpolator. The image enhancer will be described in more detail below with reference to FIG. 5.

The video data output by the image enhancer is passed to a conventional YC (luminance-chrominance) to RGB (red-green-blue) matrix. This generates red, green and blue component video signals at its output. The component video signals (or a colour bar test signal provided by a colour bar test generator 80) are supplied to an inverse gamma converter 90 which applies an inverse gamma correction function, followed by a colorimetry converter 100 and a gamma converter 110. The purpose of the chain of the inverse gamma converter 90, the colorimetry converter 100 and the gamma converter 110 is firstly to allow any gamma conversion performed in accordance with the high definition format to be reversed, then for the red, green and blue colour standards to be changed from those applicable to the high definition format to those for a standard definition format, and finally for gamma correction appropriate to the standard definition format to be applied. (It is noted that the gamma correction and colour or phosphor standards associated with high definition and standard definition video are usually different.) This arrangement also allows the colorimetry conversion to be performed on the basic R, G and B components rather than the non-linearly processed gamma-corrected versions of those components.

The output of the gamma converter 110 is supplied to an external FIFO memory 150. The purpose of the FIFO memory 150 is to allow data to be input at the clock rate associated with the input video signal and to be output at the clock rate associated with the output video signal. Thus, in this case, data is written into the FIFO memory at a clock rate related to the data rate of the input video signal, and is read out at a clock rate related to the required output video signal format.

Also by providing the FIFO memory 150 as an external connection at this point in the circuit, an external colorimetry converter or image enhancer can be inserted into the processing stream using the connections provided for the FIFO memory 150.

The output of the FIFO memory 150 is supplied back to the ASIC 10 and is routed through an optionally connected RGB to YC matrix 120 which allows the standard definition output to be in either RGB or YC form, and an optionally connected half-band chrominance filter 130. If the filter 130 is out of circuit, the output is in a 4:4:4 format. If the filter 130 is in circuit, the two chrominance data streams are half-band filtered and sub-sampled so that the output is in a 4:2:2 format. Finally, the signal is passed to an output multiplexer and blanking inserter 140.

Figure 3:
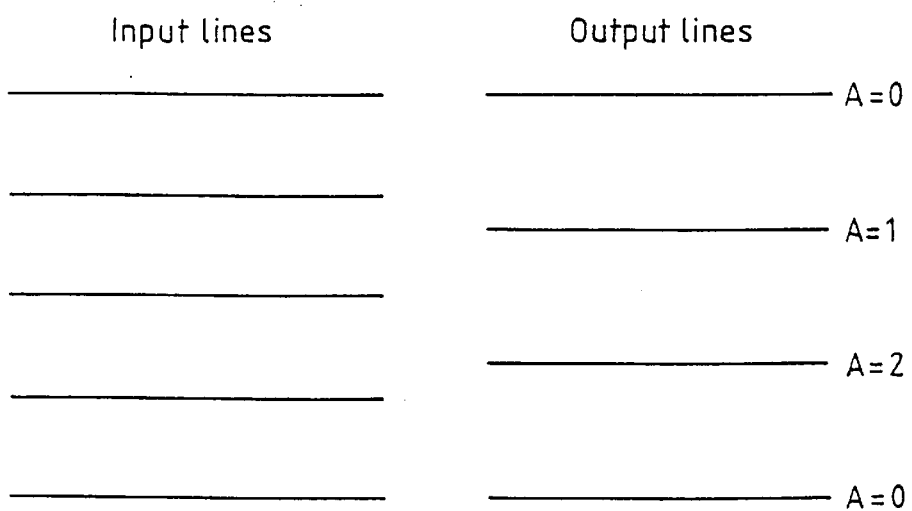
FIG. 3 is a schematic diagram illustrating coefficient address generation by a vertical interpolator.

FIG. 3 is a schematic diagram illustrating the operation of the vertical interpolator 50.

In general, an output line will not coincide spatially with the vertical position of an input line. Depending on the relative position of the current output line with respect to the input lines, a different set of coefficients will be required for the filtering process performed by the vertical interpolator. In the present system, 32 possible sets of coefficients are provided, so that the vertical position of an output line can be specified to an accuracy of $\frac{1}{32}$ of the input line spacing.

The 32 sets of coefficients are not stored at the vertical interpolator, but instead the appropriate set for each output line is loaded into registers at the vertical interpolator during the line blanking period immediately preceding each line. This avoids the need for a bank of 32 sets of 13 ten-bit registers at the vertical interpolator to store the full set of coefficients which may be required during generation of an output field.

Therefore, in order to select the correct set of coefficients to be loaded into the vertical interpolator registers at the line blanking interval, the vertical interpolator comprises a counter which maintains a cyclic count of the position of the next output line with respect to the input lines, expressed, in this case, in modulo 32 arithmetic to correspond to the 32 possible sets of coefficients. This address signal is transmitted to control logic (not shown in FIG. 1, but provided within the ASIC 10 and schematically illustrated in FIG. 4) to specify the correct set of coefficients to be transmitted to the vertical interpolator at the next line blanking interval.

FIG. 3 illustrates a simplified version of this process, in which three possible address values (A=0, 1, 2) may be used, corresponding to three possible sets of filter coefficients. It will be seen from FIG. 3 that the address value transmitted to the control logic depends on the relative vertical position of the current output line with respect to the input lines.

Figure 4:
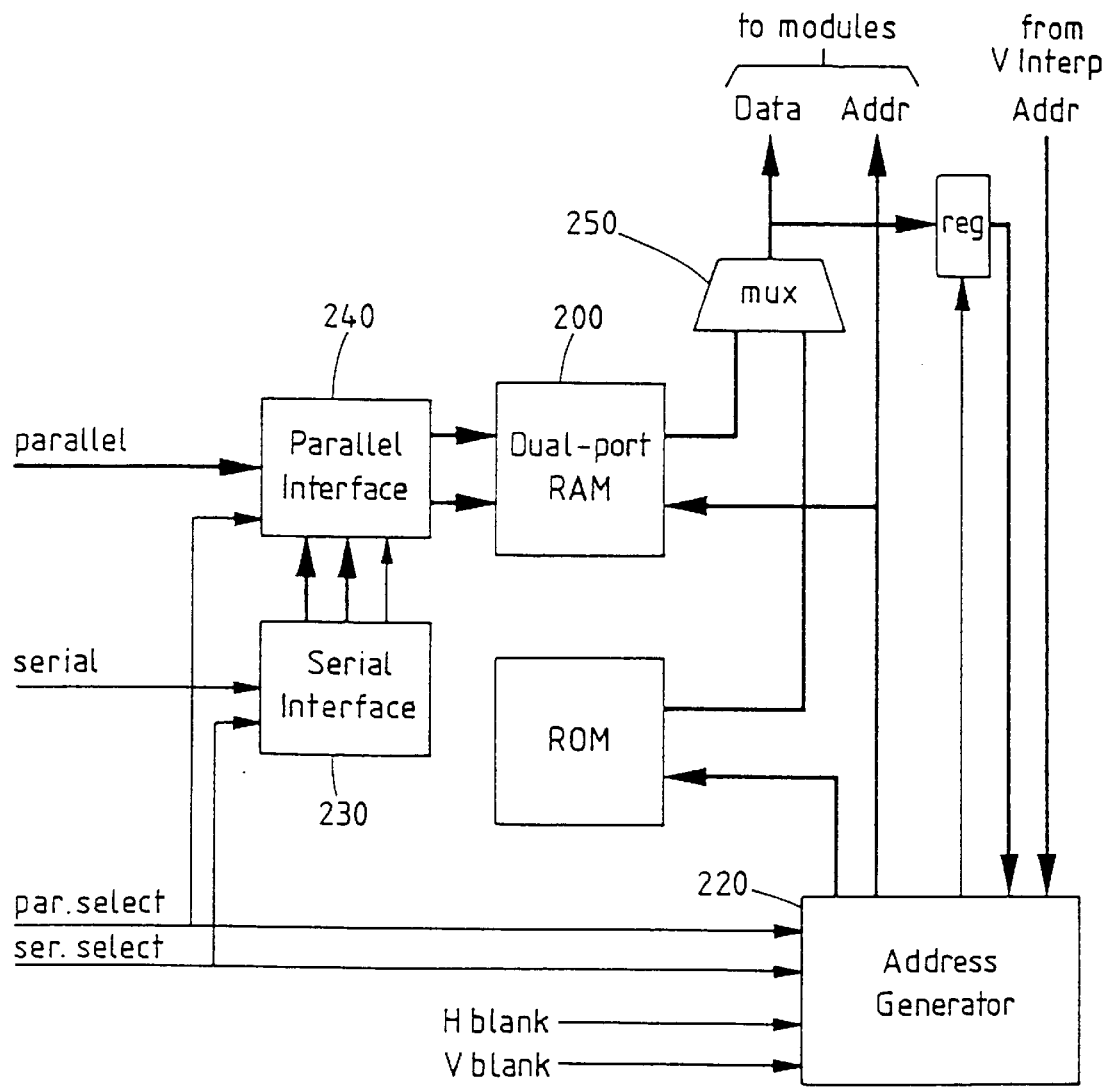
FIG. 4 is a schematic diagram of a control apparatus.

The control logic which handles the updating of the vertical interpolator coefficients and many other control matters is illustrated schematically in FIG. 4.

The control logic comprises two memories for storing coefficients and other configuration data associated with the various devices illustrated in FIG. 1. These are a dual-port random access memory (RAM) 200 and a read only memory (ROM) 210. The writing and reading of data in the dual-port RAM 200, and the reading of data in the ROM 210, is controlled by an address generator 220.

The contents of the dual-port RAM 200 and the ROM 210 will be described in more detail below, but briefly the ROM 210 contains a respective set of horizontal and vertical filter coefficients for each possible mode of operation of the down converter (as listed above), together with various possible configuration data for devices such as the image enhancer and the colorimetry converter. The ROM 210 also contains a 10-byte configuration word which defines a default mode of operation of the down converter.

The dual-port RAM 200 mirrors the structure of the ROM 210 in that it provides storage capacity for one set of horizontal and vertical filter coefficients, one set of configuration data for the image enhancer, colorimetry converter, etc., and a 10-byte configuration word.

In operation, if the default mode of operation (e.g. 1125 line, 1035 active lines high definition input to 525 line output conversion, interlaced, squeeze mode) is required, it is not necessary to load anything into the dual-port RAM 200. The use of these various sets of coefficients is specified by the 10-byte configuration word permanently written into the ROM 210, and the required coefficients are found in the ROM 210.

If, however, a different mode of operation is required but using alternative coefficients still held in the ROM 210, it is merely necessary to write a different version of the 10-byte configuration word into the RAM 200. This will then provide pointers to non-default sets of coefficients and configuration data stored in the ROM 210.

In a further possibility, if a mode of operation is required which cannot use the possible sets of coefficients and other data stored in the ROM 210, replacement coefficients can be stored in the RAM 200 and pointed to by the 10-byte configuration word held in the RAM 200.

Data can be loaded into the RAM by either a serial or a parallel interface (230, 240 respectively). Data read from the RAM and the ROM are supplied to a multiplexer 250 which selects either RAM-stored data or ROM-stored data in dependence on the state of the 10-byte configuration word either as held in the ROM or as overruled by that held in the RAM.

Each of the modules, including the horizontal and vertical interpolators, of FIG. 1 is connected by a common data and address bus. When it is required to update configuration or coefficient data relating to one of the modules, an appropriate address is placed onto the address bus by the control logic and the corresponding data placed onto the data bus. In general, coefficient and control data are updated during field blanking, with the exception of vertical interpolator coefficients which are updated during line blanking.

Figure 5:
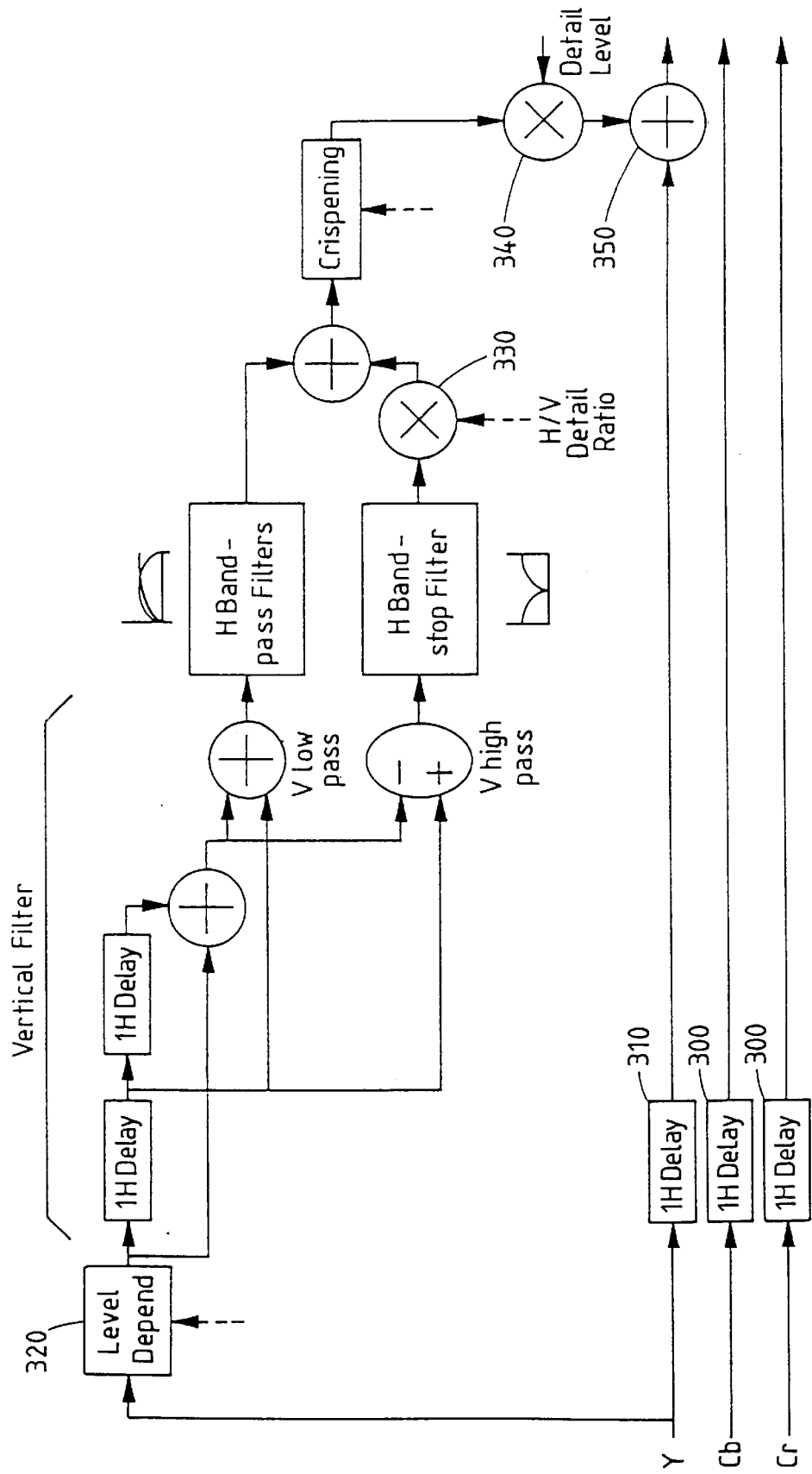
FIG. 5 is a schematic diagram of an image enhancer.

FIG. 5 is a schematic diagram of the image enhancer 60. The image enhancer's basic function is to amplify high frequency components of the video signal to enhance the reproduction of image detail. Techniques very similar to those used in, for example, the Sony DVW-700/700P and BVW-D600/D600P camera-recorders are employed.

The processing is applied only to the luminance signal; the chrominance components are simply subjected to compensating delays 300.

The luminance signal Y is therefore supplied in parallel to a delay unit 310 and a level dependent processor 320. This applies a non-linear level dependence function to the luminance signal which is designed to reduce the enhancement in dark areas which, due to gamma correction tends to contain more noise than lighter areas. The function is achieved by clipping the input pixel values to, say, 192 (out of a possible range of values up to 1024 or 10-bits), scaling the clipped signal by a factor such as $\frac{1}{16}$, truncating, and subtracting this scaled signal from the original input signal.

There follows high-pass and band-pass filtering in the horizontal and vertically directions to provide an enhancement of detail (high frequency) components and also to avoid so-called cross-colour when the down converted video is ultimately encoded using the NTSC or PAL standards.

The ratio of horizontal and vertical enhancement can be adjusted by applying a horizontal/vertical detail ratio to a multiplier 330. The combined signal is then subject to another non-linear function known as "crispening". This is designed to reduce the amount of detail added to small objects and also to reduce the amount of noise in the detailed signal. This is achieved by setting a threshold on the detail signal below which the detail gain is zero. Another function of this block is to clip the detail signal so as to limit the maximum amount of detail that may be added. The function can be achieved by clipping the input to a variable level and then subtracting the clipped signal from the original.

The level of the detail signal can be adjusted by a further multiplier 340 before it is added (350) to the delayed original luminance signal.

Figure 6:
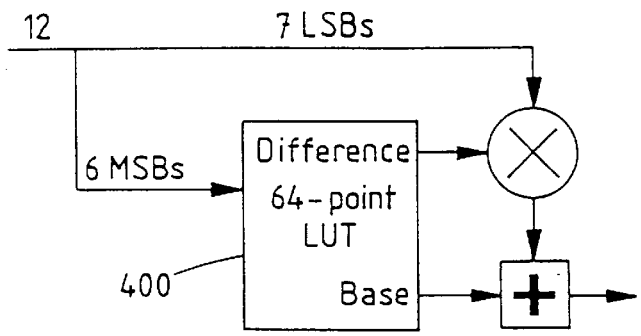
FIG. 6 is a schematic diagram of a gamma converter.
Figure 7:
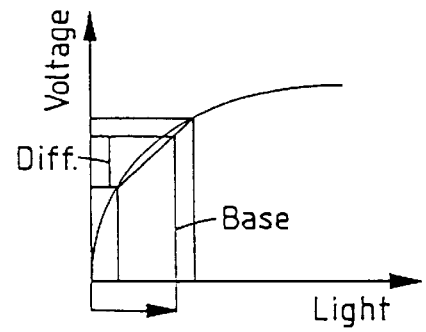
FIG. 7 is a schematic graph illustrating the characteristics of the converter of FIG. 6.
Figure 8:
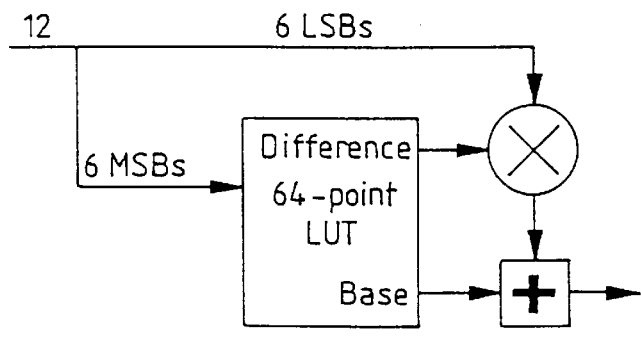
FIG. 8 is a schematic diagram of an inverse gamma converter.
Figure 9:
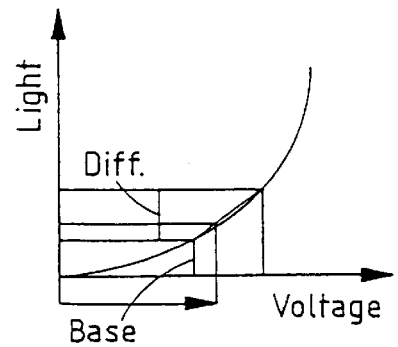
FIG. 9 is a schematic graph illustrating the characteristics of the converter of FIG. 8.

FIGS. 6 and 8 are schematic diagrams of the gamma converter and inverse gamma converter respectively, and FIGS. 7 and 9 illustrate the required gamma conversion and inverse gamma conversion transfer functions.

In each of the gamma converter and the inverse gamma converter a 64-value look-up table (LUT) is addressed by the six most significant bits of each pixel value. This yields a difference signal and a base signal as outputs. The seven least significant bits of each input pixel value are multiplied by the difference signal and are then added to the base signal to generate an output pixel value. This processing is applied in parallel to the red, green and blue pixel values. The difference and base values are selected to approximate to the required curves shown in FIGS. 7 and 9.

FIG. 10 schematically illustrates the contents of the control ROM 210.

The ROM 210 stores the ten-byte configuration word in its first ten bytes 0x000 to 0x009, followed by:

two sets of horizontal interpolation coefficients (for edge crop and squeeze mode respectively);

four sets of vertical interpolation coefficients;

two sets of inverse gamma coefficients;

two sets of output gamma correction coefficients; and three sets of colorimetry conversion coefficients.

The ten-byte configuration word stored in the ROM 210 specifies one default mode of operation of the 2×4×2×2×3 permutations of the sets of coefficients listed above.

If a non-default mode of operation is required, but still using coefficients stored in the ROM 210, then all that is necessary is to load a replacement ten-byte configuration word into corresponding addresses in the RAM 200, as shown in FIG. 11.

If further variations from the stored modes of operation are required, then further coefficients can be loaded into respective address ranges in the RAM 200 (see FIG. 11), and their use specified by setting the RAM's ten-byte configuration word accordingly.

The choice of whether the RAM's or the ROM's configuration word is to be used is set by detecting whether either a serial or a parallel external data transfer port to the dual port RAM is enabled (in which case the RAM's configuration word is to be used), or by an external control input to the control logic (not shown). However, in another embodiment the choice could be set by detecting whether a configuration word has been written into the RAM since the apparatus was last powered up.

Figure 12:
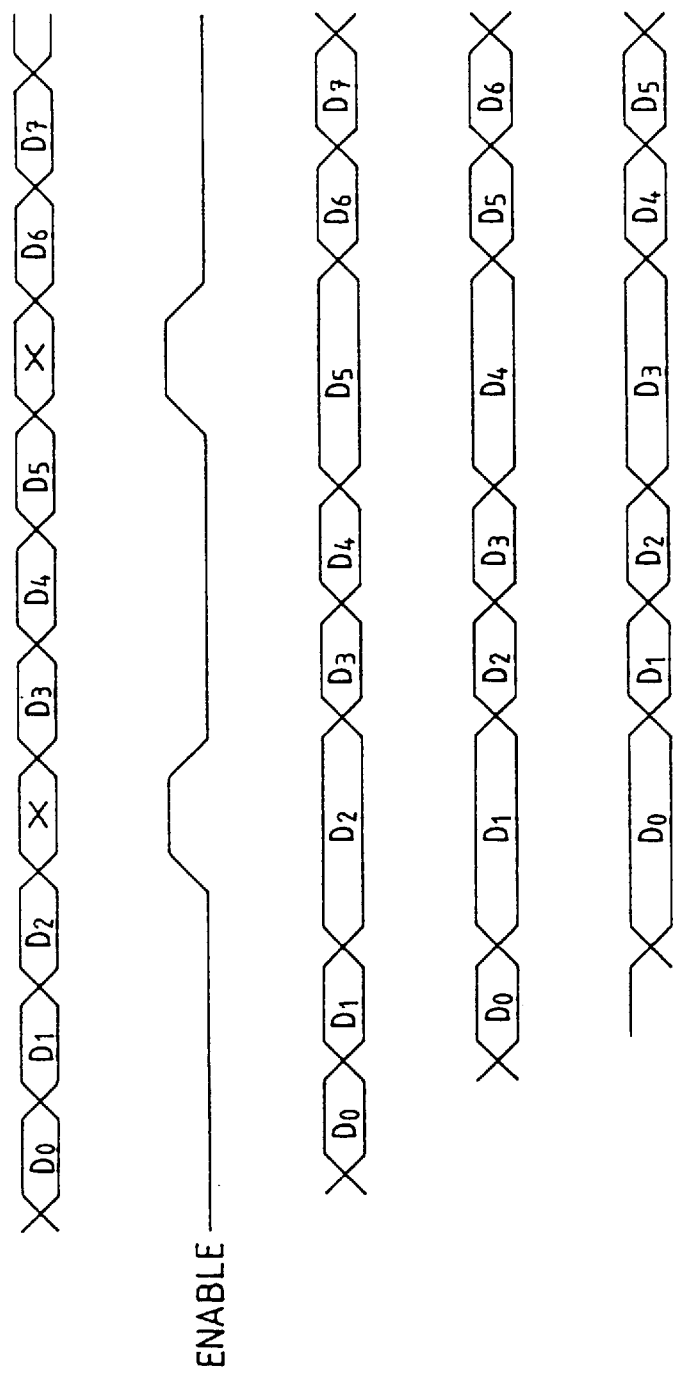
FIG. 12 is a schematic timing diagram illustrating an active data enable signal.

FIG. 12 is a schematic timing diagram illustrating the use of an active data enable signal in the apparatus of FIG. 1.

As mentioned above, the vertical interpolator produces one line of pixels at its output for every line of pixels at its input. Similarly, the horizontal interpolator generates output pixel values at the same data rate as the pixel values at its input.

The reason for arranging the circuit in this way is that all of the processing devices from the horizontal interpolator to just before the external FIFO memory can operate at the same clock speed; there is no need for a different clock at the output of the horizontal interpolator, and then a different clock again at the output of the vertical interpolator.

However, the arrangement does mean that some of the pixel values output by the horizontal interpolator are "dummy" values which are not required in the output image, and similarly some of the lines of pixels output by the vertical interpolator are completely "dummy" lines.

Therefore, in order to distinguish between real and dummy data values, an "active enable" signal is employed. This is generated by counters (not shown) associated with the horizontal and vertical interpolators, so that if, for example, the horizontal interpolator is working at a sub-sampling ratio of ¾, then the active enable flag will be high (indicating dummy data) for one in every four pixel values output by the horizontal interpolator. Similarly, if the vertical conversion ratio is about ½, then approximately one half of the lines generated by the vertical interpolator will be flagged as "dummy" lines. Overall, this will give only about ⅜ of the pixel values output by the horizontal and vertical interpolators being flagged as "active".

The active enable signal is actually generated by a logical OR combination of the respective active enable signals generated in respect of horizontal and vertical interpolation.

At each processing stage in the apparatus of FIG. 1 between the horizontal interpolator and the external FIFO, input data is latched (sampled) as a first operation, in accordance with a common clock signal. The active enable signal is supplied in parallel (i.e. not latched or delayed) to each device. If the active enable signal is high, then quite simply the current input to each device is not latched and the existing value maintained. This has the effect of "stretching" certain clock cycles for the processing elements following the horizontal interpolator.

This process is illustrated in FIG. 12, in which D0, D1, D2 . . . D7 are active pixel values, and X signifies a dummy value at every fourth pixel output by the horizontal interpolator. The second line of FIG. 12 shows the active enable signal.

When the data output by the horizontal interpolator is latched by the next device to receive it, the active enable signal prevents the dummy value X from being latched, and instead the values D2 and D5 are held for two clock cycles and processing pauses. Similarly, at the next line, the values D1 and D4 are held for two clock cycles.

Figure 13A:
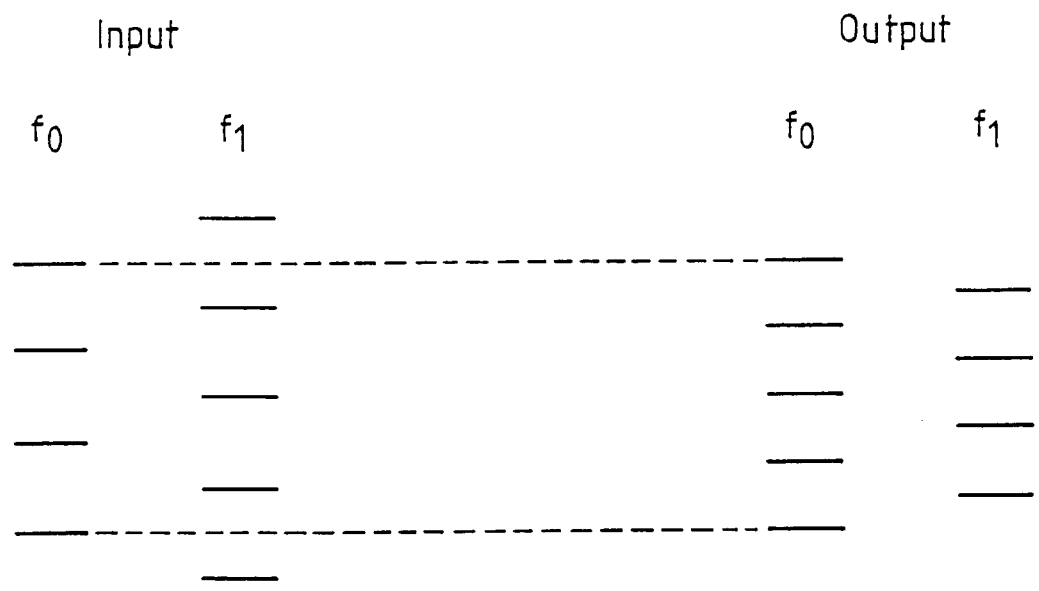
FIGS. 13a and 13b are schematic diagrams illustrating the operation of a vertical interpolator of the apparatus of FIG. 1.
Figure 13B:
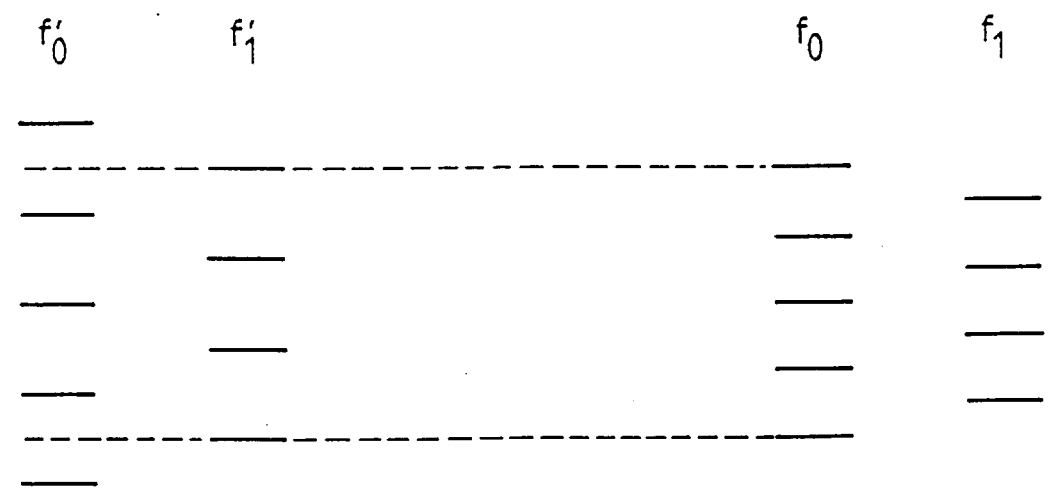

FIGS. 13a and 13b schematically illustrate part of the operation of the vertical interpolator.

In one possible use of the apparatus of FIG. 1, the input high definition video signal could be derived from a high definition source operating at a field rate of 60 Hz. However, if an NTSC output is required, the field rate must be altered by one part in one thousand to 59.94 Hz. This can conveniently be done using a field-dropping converter upstream of the down-conversion apparatus, which drops one field in every few seconds of vide, but this leads to sudden inversions in the field polarity of the signal supplied to the down-converter.

The effect of a polarity inversion is particularly evident in a video format having an odd number of active lines, since one field will have one more line than the other field.

In order to cope with occasional field polarity inversions in its input video signal, the vertical interpolator is arranged so that it can generate a particular polarity output field from either polarity of input field. This is achieved quite simply in the present design, since the vertical interpolator (in particular the counter described with reference to FIG. 3) will automatically request the correct set of interpolation coefficients for each output line in dependence on the relative position of that output line with respect to the input lines. Therefore, the only difference between an odd and an even input field as far as the requesting of interpolation coefficients is concerned is that the spatial positions of the input lines change by one half of one line.

However, it has been appreciated that this could have led to subjectively disturbing artifacts at the vertical extremes of the picture, so steps have been taken to avoid this problem.

The potential problem which has been identified and addressed is that if the larger output field (i.e. the one having the extra line) is derived from and spatially aligned with the larger input field (again, the one having the extra line), then if the input field polarity inverts, the larger output field actually extends beyond the (smaller) input field from which it must be derived. The extreme top and bottom lines of the output field are then derived at least partly from black lines in the non-active area of the input field. However, in the other input polarity the extreme output lines are derived from active lines of the input field. Therefore, when an input field polarity inversion occurs, the extreme lines of the larger output field change in luminance because they change between an interpolation from active lines and an interpolation from non-active lines.

This problem is addressed in the present system by spatially aligning the extreme lines of the output frame (i.e. the extreme lines of the larger output field) with non-extreme lines of the larger input field (i.e. at least one line in from the top and bottom of the input frame). This means that the output picture is very slightly vertically cropped, but it is considered that this is preferable to subjectively disturbing luminance variations at the top and bottom edges of the picture every few seconds when an input polarity inversion occurs.

FIGS. 13a and 13b show a particular example of this technique. In FIGS. 13a, input fields F0 and F1 of a high definition video signal are converted to respective output fields F0 and F1 of a lower definition signal. In particular, output field F0 is derived wholly from input field F0, and output field F1 is derived wholly from input field F1. Similarly in FIG. 13b, the input fields F0' and F1' are in the opposite field polarity. Output field F0 is derived wholly from input field F0' and output field F1 is derived wholly from input field F1'.

Because the extreme top and bottom lines of the larger output field are spatially aligned with the next-to-top and next-to-bottom lines of the larger input field, the larger output field never extends beyond the input field from which it is to be derived, even if there is a field polarity change in the input video signal.

Figure 14:
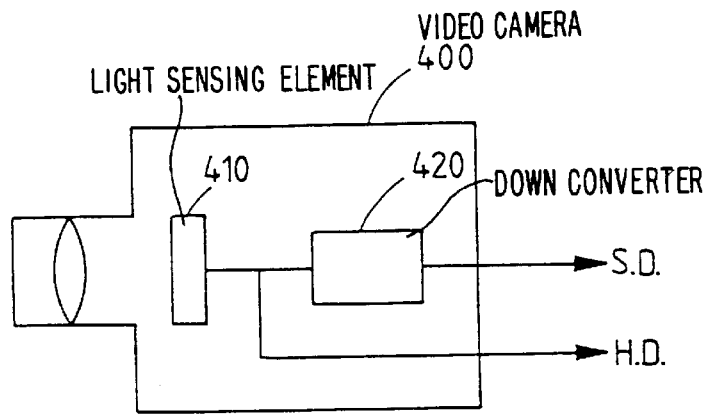
FIG. 14 schematically illustrates a video camera incorporating the apparatus of FIG. 1.
Figure 15:
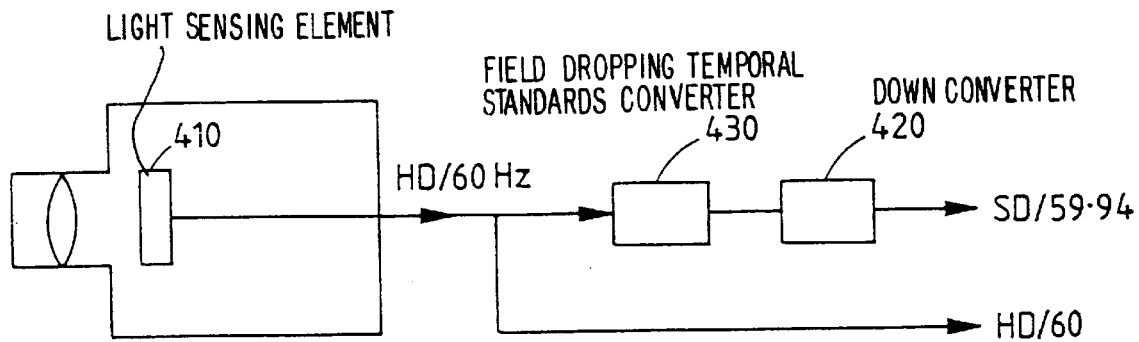
FIG. 15 schematically illustrates a video camera connected to the apparatus of FIG. 1.
Figure 16:
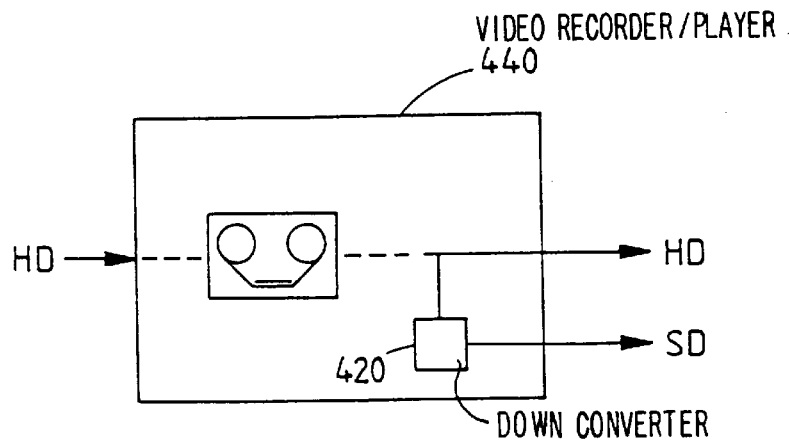
FIG. 16 schematically illustrates a video tape recorder incorporating the apparatus of FIG. 1.

FIGS. 14, 15 and 16 schematically illustrate three applications of the apparatus of FIG. 1. In particular, FIG. 14 schematically illustrates a video camera incorporating the apparatus of FIG. 1; FIG. 15 schematically illustrates a video camera connected to the apparatus of FIG. 1; and FIG. 16 schematically illustrates a video tape recorder incorporating the apparatus of FIG. 1.

In FIG. 14, a video camera 400 comprises a high definition light sensing element 410 operable to generate a high definition video signal. A down-converter 420 of the type described above is placed in a parallel signal path (with a video analogue-to-digital converter as appropriate) so that the camera can output substantially simultaneously a standard definition and a high definition signal. If desired, a delay element could be inserted in the high definition signal path to compensate for the processing delay of the down converter 420.

FIG. 15 illustrates a similar arrangement with the camera generating a high definition 60 Hz video signal. A field dropping temporal standards converter 430 is connected between the high definition camera output and the down converter 420. The field dropping converter operates to change the field rate of the video signal from 60 Hz to 59.94 Hz (a change of one part in 1000) by dropping a video field once in every few seconds. This leads to discontinuities in the field polarity sequence of the signal supplied to the down converter 420, but this is compensated by the operation of the down converter as described above.

Finally, FIG. 16 schematically illustrates a high definition video recorder/player 440, again incorporating a down converter 420 to provide substantially simultaneous outputs in high definition and standard definition formats.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video down-conversion apparatus comprising:

an interpolator for interpolating lines of successive output video fields from lines of respective input video fields; and a controller for causing said interpolator to selectively interpolate each output field from an input field of either field polarity so that said successive output video fields can maintain a regular odd-even field polarity sequence even if there is a discontinuity in the field polarity sequence of said input video fields.

2. Apparatus according to claim 1, wherein:

successive input frames each comprise a respective pair of temporally adjacent input fields;

successive output frames each comprise a respective pair of temporally adjacent output fields; and extreme top and bottom active lines of said output frames are spatially aligned with active lines of said input frames other than said extreme top and bottom active lines of said input frames such that said interpolator does not interpolate said extreme top and bottom lines of said output frames from said extreme top and bottom active lines of said input frames.

3. Apparatus according to claim 1, further comprising means for generating said output video fields with a field rate of 59.94 Hz.

4. Apparatus according to claim 3, wherein said interpolator interpolates said input video fields to said output video fields having a 525 lines.

5. Apparatus according to claim 3, wherein said means for generating is a field-dropping temporal standards converter for generating said input video fields with a field rate of 59.94 Hz from a 60 Hz field rate video source.

6. A video down-conversion apparatus in which lines of successive output video fields are interpolated from lines of respective input video fields, comprising:

an input for inputting successive input frames each comprising a respective pair of temporally adjacent input fields;

an output for outputting successive output frames each comprising a respective pair of temporally adjacent output fields; and a controller for controlling extreme top and bottom active lines of said output frames to be spatially aligned with active lines of said input frames other than said extreme top and bottom active lines of said input frames such that said extreme top and bottom lines of said output frames are not interpolated from said extreme top and bottom active lines of said input frames.

7. A video down-conversion apparatus according to claim 1, further comprising a video camera for generating said successive input frames.

8. A video down-conversion apparatus according to claim 6, further comprising a video camera for generating said successive input frames.

9. A video down-conversion apparatus according to claim 1, further comprising a video storage unit for storing said output frames.

10. A video down-conversion apparatus according to claim 6, further comprising a video storage unit for storing said output frames.

* * * * *